(12) United States Patent
Matsuhira

(10) Patent No.: US 7,511,849 B2
(45) Date of Patent: Mar. 31, 2009

(54) IMAGE PROCESSING DEVICE, PRINTER AND PRINTER CONTROL METHOD

(75) Inventor: Masatoshi Matsuhira, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 758 days.

(21) Appl. No.: 11/042,331

(22) Filed: Jan. 26, 2005

(65) Prior Publication Data

US 2005/0185158 A1 Aug. 25, 2005

(30) Foreign Application Priority Data

Jan. 29, 2004 (JP) ............................. 2004-022069
Dec. 2, 2004 (JP) ............................. 2004-349489

(51) Int. Cl.
G06K 1/00 (2006.01)
H04N 7/18 (2006.01)
H04N 9/09 (2006.01)
H04N 5/76 (2006.01)

(52) U.S. Cl. .................... 358/1.15; 358/1.16; 358/1.18; 348/155; 348/262; 348/231.3

(58) Field of Classification Search ................ 358/1.15, 358/1.16, 1.14, 335, 401, 403, 1.18; 715/527; 348/207.1, 208.13, 239, 155, 262, 231.3; 355/39, 40, 41, 42, 43, 44
See application file for complete search history.

(56) References Cited

U.S. PATENT DOCUMENTS 5,706,097 A * 1/1998 Schelling et al. ............. 358/296
6,615,016 B2 * 9/2003 Kimura ....................... 399/303
6,711,637 B2 * 3/2004 Tateyama .................... 710/65

(Continued)

FOREIGN PATENT DOCUMENTS

EP 1381220 A2 * 1/2004

(Continued)

OTHER PUBLICATIONS

Kim,J.H. "fast frame to frame interpolation", Sep. 26, 1991,IEEE, vol. 27, 1788-1790(1-3).*

(Continued)

*Primary Examiner*—Mark K Zimmerman
*Assistant Examiner*—Haris Sabah
(74) *Attorney, Agent, or Firm*—Sughrue Mion, PLLC

(57) ABSTRACT

Provided is an image processing device capable of efficiently executing index printing based on motion picture data. A printer having a function of index-printing a plurality of frame images based on motion picture data, includes: a setting unit for setting the number of thumbnail images in the index printing; a first designation unit for designating motion picture data; a first printing unit for selecting and printing, upon dividing the designated motion picture data into a plurality of partial motion picture data according to the set number of the thumbnail images, a frame image for each of the divided partial motion picture data; a second designation unit for designating specific partial motion picture data from the plurality of partial motion picture data; and a second printing unit for selecting and printing, upon additionally dividing the designated specific partial motion picture data into a plurality of partial motion picture data according to the set number of the thumbnail images, a frame image for each of the divided partial motion picture data 8 Claims, 11 Drawing Sheets

U.S. PATENT DOCUMENTS

| | | | |
|---|---|---|---|
| 6,937,356 B1 * | 8/2005 | Ito et al. | 358/1.16 |
| 2003/0052910 A1 * | 3/2003 | Shiiyama | 345/719 |
| 2003/0107777 A1 * | 6/2003 | Yamade et al. | 358/442 |
| 2003/0189738 A1 * | 10/2003 | Kuwata et al. | 358/527 |
| 2004/0105123 A1 * | 6/2004 | Fritz et al. | 358/1.16 |
| 2004/0196376 A1 * | 10/2004 | Hosoda et al. | 348/207.1 |
| 2004/0252335 A1 * | 12/2004 | Yano et al. | 358/1.15 |
| 2005/0185158 A1 * | 8/2005 | Matsuhira | 355/40 |
| 2006/0110128 A1 * | 5/2006 | Dunton et al. | 386/52 |

FOREIGN PATENT DOCUMENTS

| | | | |
|---|---|---|---|
| EP | 1424829 A1 * | 6/2004 | |
| JP | 2001-94911 A | 4/2001 | |

OTHER PUBLICATIONS

Lipp, J.I. "frame to frame image motion", Aug. 16-18, 1993, IEEE, vol. 1, 744-747(1-4).*

* cited by examiner

IMAGE PROCESSING DEVICE, PRINTER AND PRINTER CONTROL METHOD

BACKGROUND OF THE INVENTION

1. Field of the Invention

The present invention relates to a technology of an image processing device having a function of printing/displaying a plurality of still images from motion picture data as index images.

2. Description of the Related Art

In recent years, pursuant to the rapid diffusion of digital cameras and the like and the price reduction of personal computers and printers, there is an increasing number of users who store and edit images such as still images and motion pictures taken with a digital camera in their personal computers or print the same with their printers at home. Further, in recent days, printers capable of directly reading and printing images (hereinafter referred to as a "direct printer") from a digital camera or the like (or from the memory card thereof) without going through a personal computer are being introduced.

Here, when performing printing processing or editing processing and so on to the motion picture data, as the prerequisite thereof, it is necessary to select still image data (frame data) of each frame constituting the motion picture.

For example, the gazette of Japanese Patent Laid-Open Publication No. H2001-94911 discloses a motion picture image printing system of printing the still images within the motion picture image by the user designating a desired range or number of copies of the successive frames (c.f. Japanese Patent Laid-Open Publication No. H2001-94911).

SUMMARY OF THE INVENTION

According to the conventional printing system described in the gazette of Japanese Patent Laid-Open Publication No. H2001-94911 indicated above, the user is able to print a plurality of still images from motion picture data by designating the print start frame number, print end frame number and print frame skip designation and so on.

Nevertheless, with the conventional method, the user has to designate the various conditions for printing such as the print start frame number, print end frame number and print frame skip designation and so on based on hard coding depending on one's own speculation or intuition.

Thus, when the user is inexperienced with this operation, such user will have to repeat index printing over and over by trial and error until reaching the desired still image, and there is a problem in that it is difficult to smoothly reach the desired still image. Further, when the size of the target motion picture data is large, the designation of the appropriate range or skipping interval to be the target is difficult, and there is a strong tendency in that the still image cannot be selected efficiently.

Thus, an object of the present invention is to provide an image processing device capable of efficiently executing index printing based on motion picture data such that a user can easily arrive at one's desired still image.

In order to overcome the foregoing problems, the present invention is constituted to enable the phased refinement and setting of the range of motion picture data to become the target of index printing (display) based on the results of index printing (display).

Specifically, the present invention is a printer having a function of index-printing a plurality of frame images based on motion picture data, comprising: a setting means for setting the number of thumbnail images in the index printing; a first designation means for designating motion picture data; a first printing means for selecting and printing, upon dividing the designated motion picture data into a plurality of partial motion picture data according to the set number of the thumbnail images, a frame image for each of the divided partial motion picture data; a second designation means for designating specific partial motion picture data from the plurality of partial motion picture data; and a second printing means for selecting and printing, upon additionally dividing the designated specific partial motion picture data into a plurality of partial motion picture data according to the set number of the thumbnail images, a frame image for each of the divided partial motion picture data.

Further, it is preferable that the first printing means performs printing upon associating the frame image selected for each the partial motion image data and the number of the thumbnail image to which the frame image is disposed.

Moreover, the second designation means is characterized in that it designates the specific partial motion picture data by designating the thumbnail image number.

In addition, when the designated specific partial motion picture data is constituted by one frame, the second printing means prints the frame image corresponding to the one frame as a normal print image, and, when the designated specific partial motion picture data is constituted by a plurality of frames, the second printing means prints the plurality of frame images based on the specific partial motion picture data as an index image.

Further, when partial motion picture data containing one frame to become the starting point and partial motion picture data containing one frame to become the ending point of range specification printing are designated by the second designation means, the second printing means prints the frame image(s) contained between the starting point and ending point as a normal print image in range specification printing.

Moreover, the present invention is also a printer having a function of index-printing a plurality of frame images based on motion picture data, comprising: a setting means for setting the number of thumbnail images in the index printing; a designation means for designating motion picture data to be the subject of printing; and a printing means for selecting and printing, upon partitioning the motion picture data into a plurality of areas according to the set number of the thumbnail images, a frame image for each area; wherein the designation means is constituted so as to refine and designate the range of motion picture data to be the subject of printing by designating the partitioned area.

In addition, the present invention is also a printer control method having a function of index-printing a plurality of frame images based on motion picture data, comprising: a step of setting the number of thumbnail images in the index printing; a step of designating motion picture data; a step of selecting and printing, upon dividing the designated motion picture data into a plurality of partial motion picture data according to the set number of the thumbnail images, a frame image for each of the divided partial motion picture data; a step of designating specific partial motion picture data from the plurality of partial motion picture data; and a step of selecting and printing, upon additionally dividing the designated specific partial motion picture data into a plurality of partial motion picture data according to the set number of the thumbnail images, a frame image for each of the divided partial motion picture data.

Further, the present invention is also an image processing device having a function of index-displaying on a display device a plurality of frame images based on motion picture data, comprising: a setting means for setting the number of thumbnail images in the index printing; a first designation means for designating motion picture data; a first display means for selecting and displaying on the display device, upon dividing the designated motion picture data into a plurality of partial motion picture data according to the set number of the thumbnail images, a frame image for each of the divided partial motion picture data; a second designation means for designating specific partial motion picture data from the plurality of partial motion picture data; and a second display means for selecting and displaying on the display device, upon additionally dividing the designated specific partial motion picture data into a plurality of partial motion picture data according to the set number of the thumbnail images, a frame image for each of the divided partial motion picture data.

Moreover, the present invention is also a program for making an image processing device function as a means for index-displaying on a display device a plurality of frame images based on motion picture data, the program makes the image processing device function as: a setting means for setting the number of thumbnail images in the index printing; a first designation means for designating motion picture data; a first display means for selecting and displaying on the display device, upon dividing the designated motion picture data into a plurality of partial motion picture data according to the set number of the thumbnail images, a frame image for each of the divided partial motion picture data; a second designation means for designating specific partial motion picture data from the plurality of partial motion picture data; and a second display means for selecting and displaying on the display device, upon additionally dividing the designated specific partial motion picture data into a plurality of partial motion picture data according to the set number of the thumbnail images, a frame image for each of the divided partial motion picture data.

The computer program of the present invention may be installed or loaded onto a computer via various mediums such as a CD-ROM, magnetic disk, semiconductor memory and communication network. Further, this includes cases where the computer program is recorded and distributed in a card or an option board.

According to the present invention, the user is able to efficiently select a desired still image based on the results of the index image.

DETAILED DESCRIPTION OF THE PREFERRED EMBODIMENTS

First Embodiment

The first embodiment of the present invention is now explained with reference to the drawings. Incidentally, in the this embodiment, explained is a case of employing the image processing device pertaining to the present invention in a printer having an index printing function for simultaneously printing a plurality of still images based on motion picture data as an index image.

(Constitution of Printer)

Figure 1:
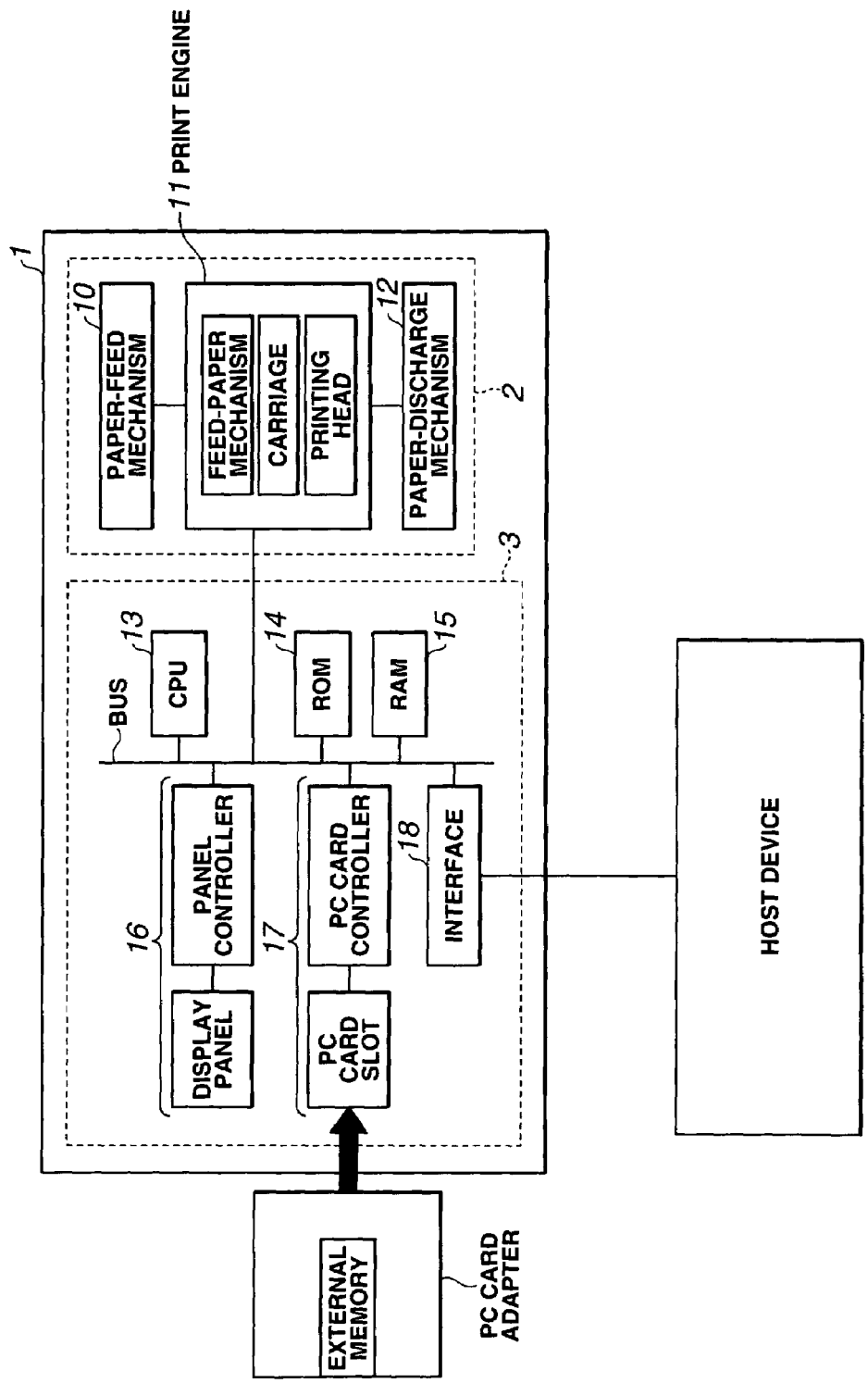
FIG. 1 is a block diagram showing the hardware constitution of a printer system 1.

FIG. 1 is block diagram representing the hardware constitution of a printer 1 according to the present embodiment. The printer 1 in this embodiment corresponds to a so-called direct printer, and comprises a power mechanism unit 2 and a printer control unit 3. The power mechanism unit 2 is constituted by a paper-feed mechanism 10 for supplying paper inside the printer, a print engine 11 for performing printing, and a paper-discharge mechanism 12 for discharging paper outside the printer. The print engine 11 is constituted by including a feed-paper mechanism, carriage mechanism, printing head and the like.

The printer control unit 3 is used for controlling the power mechanism unit 2 so as to make it perform printing operations, and, specifically, is constituted by a CPU (processor) 13, a ROM 14, a RAM 15, a display panel and panel controller 16, a PC card slot and PC card controller 17, an interface 18 such as a USB, and so on. The CPU 13 is constituted to be accessible to the respective devices 14 to 18 via a bus. Incidentally, the power mechanism unit 2 may be independent and comprise a CPU, and, in such a case, the CPU of the power mechanism unit 2 will communicate with the CPU 13 via a parallel interface or the like, and control the print engine 11 so as to make it perform printing operations.

The constitution and operation of the power mechanism unit 2 and printer control unit 3, as a general rule, are the same as the constitution and operation of conventional printer devices. For example, the printer 1 has a function of receiving a print job from the host device via the interface 18, or directly reading image data from an external memory via a PC card slot 17/from an information-processing device such as a digital camera via the interface 18, and controlling the power mechanism unit 2 so as to make it perform printing operations based on such print job or image data. Further, the printer 1 also comprises an expansion function of motion picture image compression data and a motion picture image display function, and an index printing function of expanding the input motion picture image compression data and printing a plurality of still images as an index image.

In addition to the conventional constitution described above, the printer 1 is also constituted to enable the execution of refinement index print processing for executing the index printing in phases (refinement index printing function).

Figure 2:
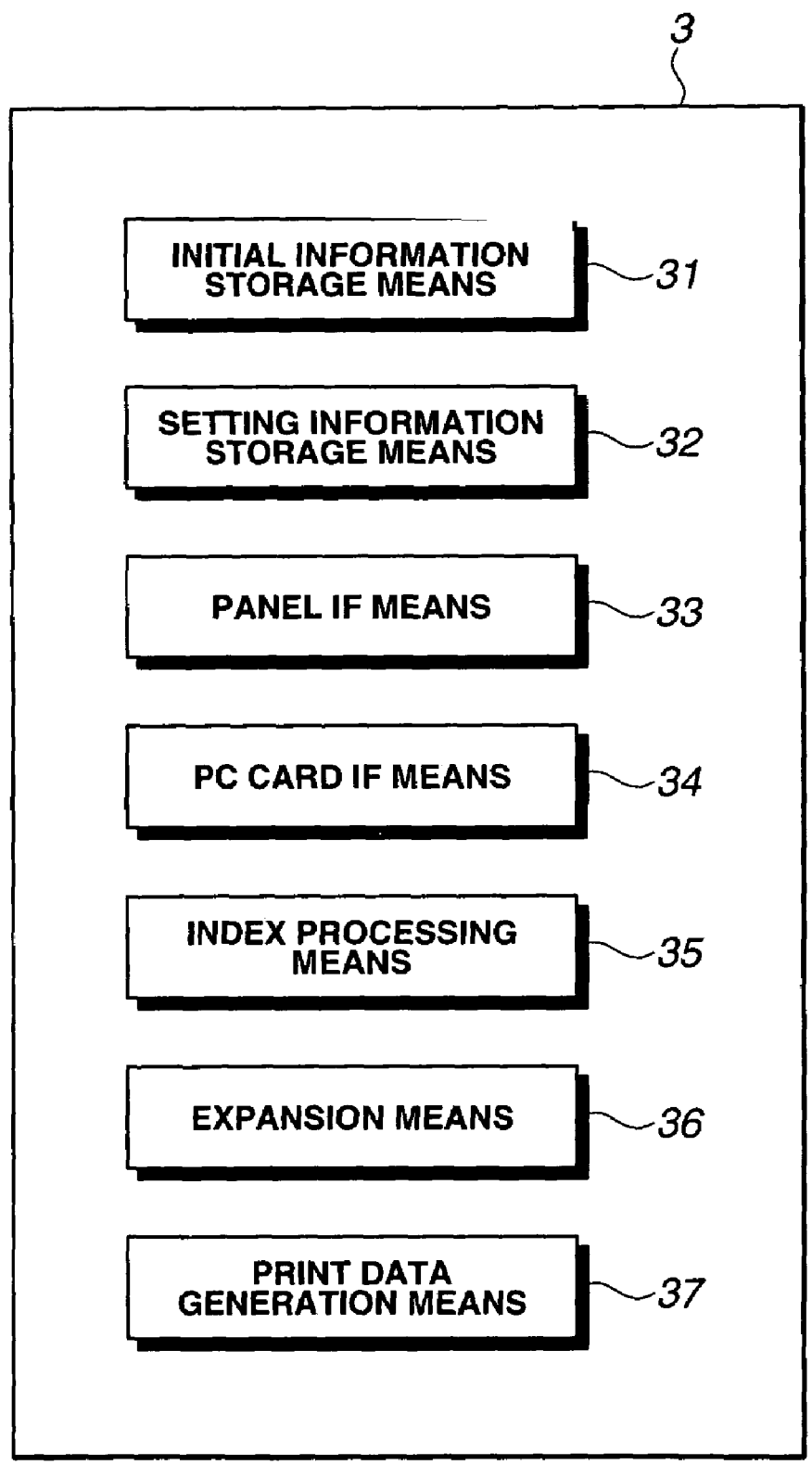
FIG. 2 is a functional configuration showing the function of a printer control unit 3.

FIG. 2 shows the main functional configuration in the printer control unit 3 for realizing the refinement index printing function. As shown in FIG. 2, the printer control unit 3 is constituted by comprising an initial information storage means 31, a setting information storage means 32, a panel IF means 33, a PC card IF means 34, an index processing means 35, an expansion means 36, a print data generation means 37, and so on. Each of the foregoing means can be functionally realized by the CPU 13 executing the programs stored in the ROM 14 or RAM 15. Incidentally, in addition to each of the foregoing means, the printer control unit 3 may also comprise image processing (size conversion processing, noise reduction, sharpness and the like) means provided to standard printers.

The initial information storage means 31 stores the initial information of the various configuration parameters required in index printing processing. As the configuration parameter, for instance, considered may be the number of images to be printed (number of thumbnail images to be printed) in a single index printing processing, the paper size, and so on. Incidentally, the constitution may be such that the user is able to change such initial information.

The setting information storage means 32 stores the values of various printing parameters set in the execution of the index printing processing. As the printing parameter, for instance, considered may be the start frame number, end frame number and total number of frames of the motion picture data to be the subject of index printing, the number of frames (number of interval frames) for each divided partial motion picture data upon dividing the motion picture data into a plurality of partial motion picture data according to the number of thumbnail images to be printed, and so on.

The panel IF means 21 is used for receiving a command (display operation command, print control command and the like) to the printer 1 from the user via the display panel and panel controller 16 constituted by, for instance, an LCD or operation key, and outputting the print status and so on to the user. As the print control command, in addition to the print execution command for requesting the execution of normal printing and the index execution command for requesting the execution of normal index printing, a command (refinement index print execution command) for requesting the execution of refinement index printing and so on correspond thereto. Further, the panel IF means 21 is also used for receiving the designation of motion picture data to be the subject of printing from the user, and, in the case of refinement index printing, it is used for receiving the designation of specific partial motion picture data within the plurality of partial motion picture data, in which the motion picture data was divided, for instance, by the designation of the thumbnail image number.

The PC card IF means 34 is used for reading and writing data to and from the external memory (e.g., flash memory) installed in a PC card adapter via the PC card slot and PC card controller 18.

The index processing means 35 sets prescribed printing parameters (e.g., start frame number, end frame number, number of interval frames) based on the target motion picture data upon executing index print processing, and specifies the index image to be printed. Moreover, when executing index printing again based on the results of index printing, the target range of the subject index printing is set based on the printing results of the previous index printing. Specifically, when the panel IF means 21 receives the designation of specific partial motion picture data within the plurality of partial motion picture data, in which the motion picture data was divided, for instance, by the designation of the thumbnail image number, the partial motion picture data corresponding to the received thumbnail image number is set as the target range. After the target range is set, the index processing means 35 additionally divides the set partial motion picture data into a plurality of partial motion picture data according to the number of thumbnail images, and selects and prints the frame image for each divided partial motion picture data.

Figure 3:
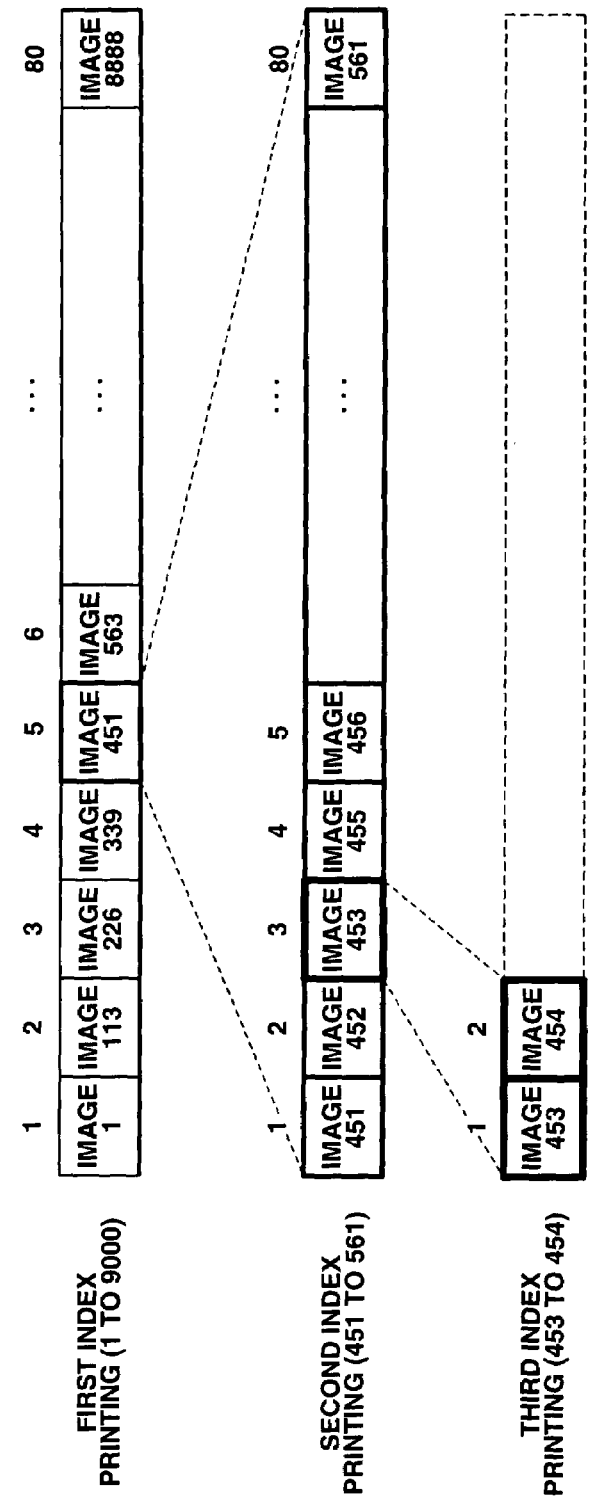
FIG. 3 is a diagram for explaining the processing contents of refinement index printing.

FIG. 3 is a diagram for explaining the processing contents of such refinement index printing. In FIG. 3, explained is a case where the number of thumbnail images to be printed in index printing is 80, and the total number of frames of the target motion picture data is 9000.

The first index printing partitions the target motion picture data into a plurality of partial motion picture data according to the number of thumbnail images to be printed, and specifies one frame image for each partial motion picture data. In FIG. 3, the motion picture data having 9000 frames is divided into partial motion picture data 1 to 80 corresponding to 80 thumbnail images, and one frame image is specified for each partial motion picture data. In FIG. 3, a square corresponds to a thumbnail image to be printed, and the indication in the thumbnail image to be printed represents the frame number of the frame image, and the indication above the thumbnail image to be printed is the thumbnail image number (identification information for identifying the partial motion picture data). Here, 80 frame images are index-printed in 112 frame intervals from start frame number 1.

The second index printing is refinement index printing, and, when the thumbnail image number in the first index printing is designated, index printing is executed again targeting the partial motion picture data corresponding to the designated thumbnail image number. Here, since the thumbnail image number=5 is selected in the first index printing, the second index printing is executed targeting the partial motion picture data (451 to 562) corresponding to the thumbnail image number 5.

The third index printing is also refinement index printing similar to the second index printing, and designates the thumbnail image number in the second index printing. Here, since the thumbnail image number=3 is selected, the third index printing is executed targeting the partial motion picture data (453 to 454) corresponding to the thumbnail image number 3.

According to the constitution of the foregoing refinement index printing, since the subject of index printing (range of motion picture data) can be refined in phases according to the user's designation, the user is able to efficiently arrive at one's desired still image.

The expansion means 36 is used for reading the target image compression data from a reception buffer or external memory, performing expansion processing to the read image compression data, and restoring the image data. As the expansion processing, employed may be known processing corresponding to the compression method (JPEG method, motion JPEG method, MPEG method and so on).

For example, when the image compression data is a JPEG file, restoration of the Huffman code and restoration of the Run-Length compression are performed regarding the AC component for each 8×8 block, frequency distribution is calculated by performing reverse quantization together with the DC component, and the image data is restored by performing inverse DCT to such frequency distribution. Upon expanding the motion picture image compression data and generating still image data (frame data) for each frame, the expansion means 36 stores this in the frame memory as the storage means.

The print data generation means 37 is used for performing prescribed image processing (e.g., sharpness processing, noise reduction processing, color conversion processing, dither processing such as an error diffusion method) normally conducted in printing operations to the restored image data, and generates print data (print images).

The print control means 3 controls the feed-paper mechanism and the like of the print engine 11 to organize a state necessary to start printing based on the control command read from the reception buffer or a command input via the panel IF means 21, transfers the print image of a prescribed unit (e.g., one path worth) generated with the print data generation means 37 to the print engine 11, and executes printing while controlling the print engine 11.

(Index Printing Processing)

Figure 4:
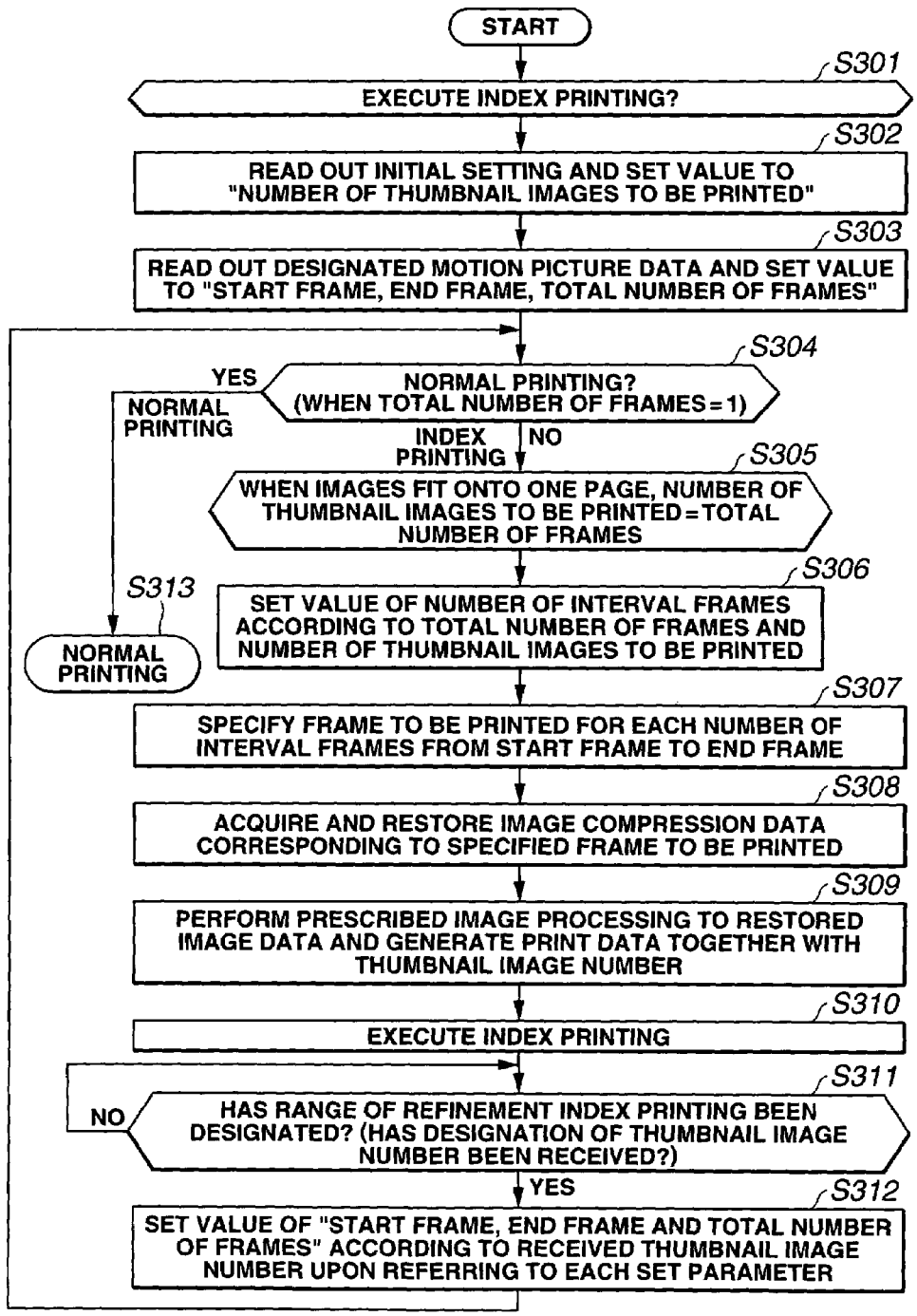
FIG. 4 is a flowchart for showing an example of index printing processing.
Figure 5:
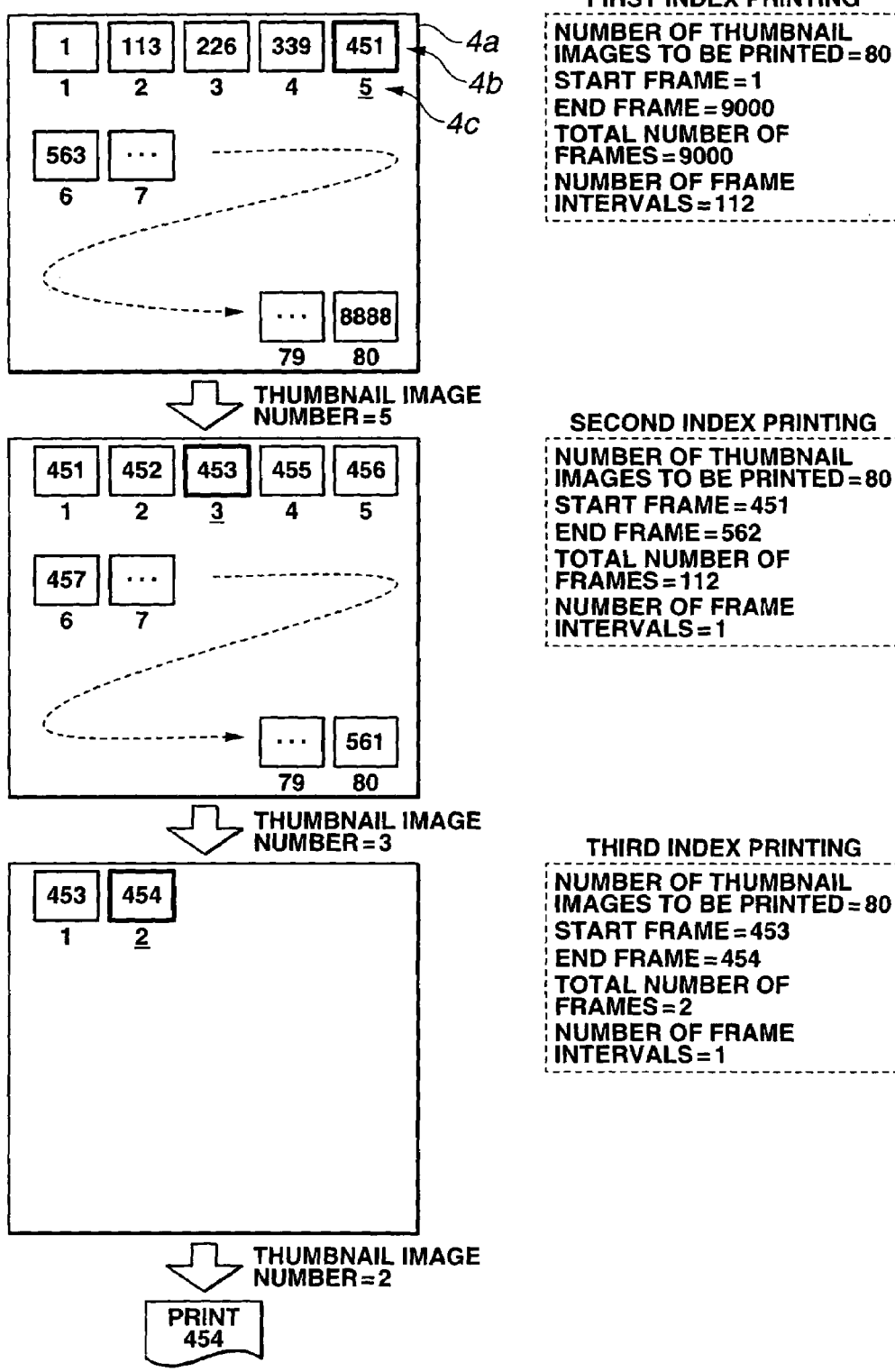
FIG. 5 is a diagram showing the printing result of index printing based on the processing illustrated in FIG. 4.
Figure 6:
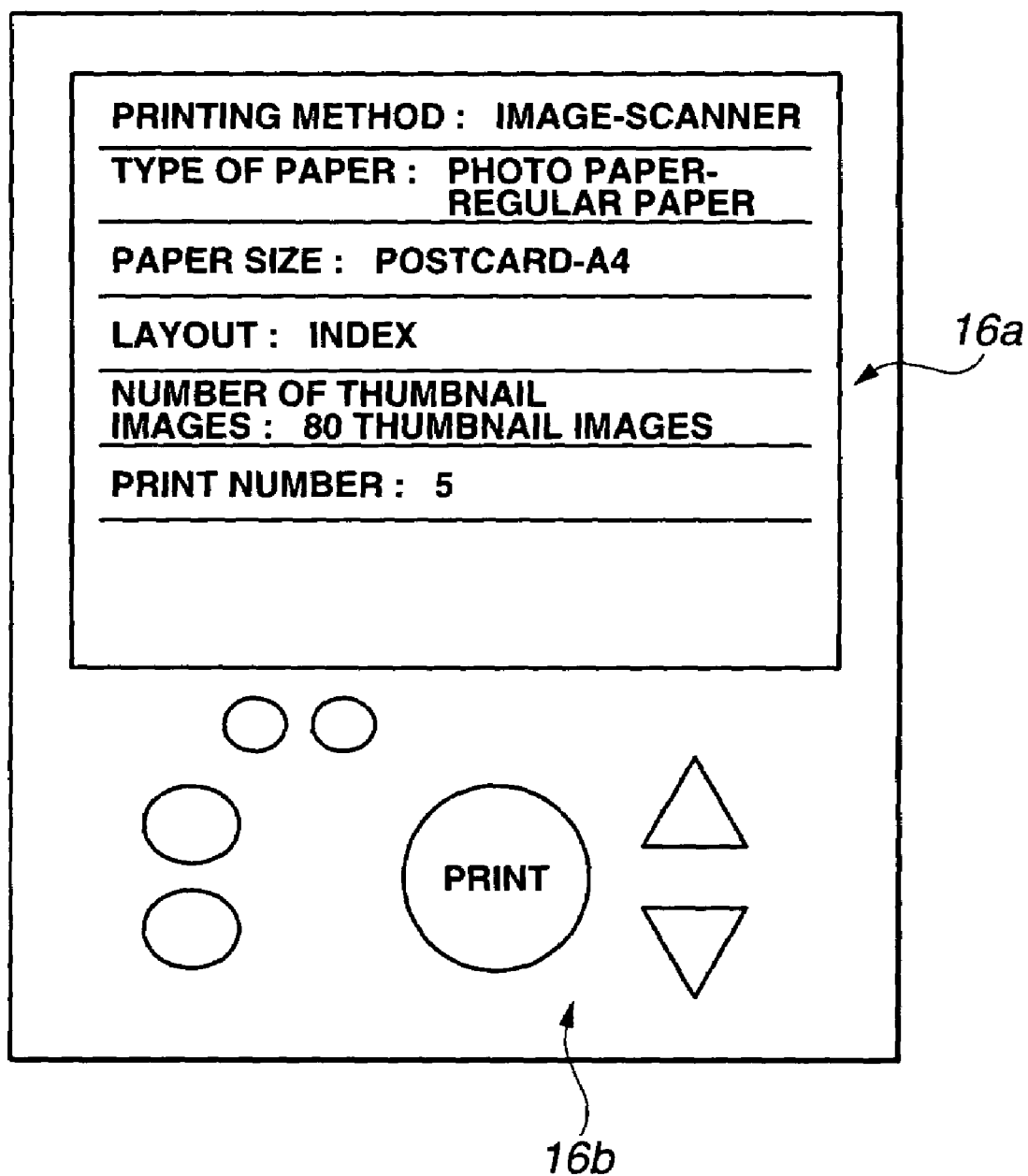
FIG. 6 is a diagram showing an example of the panel IF means.

Index printing processing in the printer 1 is now explained in detail with reference to the flowchart and other diagrams shown in FIG. 4 to 6. The order of the respective steps may be arbitrarily changed or may be executed in parallel within a range that will not contradict the processing contents thereof. Further, the end of processing may be realized by employing, for example, interruption or the like. FIG. 4 is a flowchart showing an example of the index printing processing by the printer control unit 3. FIG. 5 is a diagram showing the printing result of index printing. FIG. 6 is a diagram for explaining the constitution of the display panel.

Index printing processing is commenced when the panel IF means 21 receives an index printing designation command from the user. The panel IF means 21, upon receiving the index printing designation command from the user, notifies the index processing means 35 of the execution designation of index printing (STEP 301).

The index processing means 35 reads the initial setting from the initial information storage means 31, and sets a value (80 for instance) to the number of thumbnail images to be printed as the configuration parameter (STEP 302).

Next, the index processing means 35 receives the designation of motion picture data (e.g., a motion picture file) from the user via the panel IF means 21, reads the designated motion picture data from the PC card IF means 33, and sets the respective printing parameters (STEP 303).

Specifically, as the printing parameter, values of the start frame number, end frame number and total number of frames in the motion picture data are set. These values may be calculated pursuant to the frame rate or reproduction time (seconds) of the target motion picture data. For example, when the designated motion picture data has a reproduction time of 600 seconds at a $\frac{1}{15}$ frame rate, "1", "9000" and "9000" are respectively set as the start frame number, end frame number and total number of frames. Such set start frame number, end frame number and total number of frames are stored in a prescribed storage area.

Next, the index processing means 35 determines whether it is normal printing or not (STEP 304). When the total number of frames is 1, since it is the final image, this is determined as being normal printing, and normal printing processing is executed (STEP 313).

Meanwhile, when the total number of frames is not 1, this is determined as being index printing. Subsequently, the index processing means 35 determines whether the total number of frames is smaller than the number of thumbnail images to be printed, and, when the total number of frames is smaller then the number of thumbnail images to be printed, since the number of frames of the motion picture data is less than the number of thumbnail images to be printed, the value of the total number of frames is set as the value of the number of thumbnail images to be printed (STEP 305).

Next, the index processing means 35 sets the value of the number of frames for each partial motion picture data upon dividing the motion picture data into a plurality of partial motion picture data based on the total number of frames and the number of thumbnail images to be printed (STEP 306).

Specifically, the number of frames (number of interval frames of the index image) for each partial motion picture data upon dividing the motion picture data into a plurality of partial motion picture data is calculated by dividing the total number of frames of the motion picture data by the number of thumbnail images to be printed. When the total number of frames is "9000" and the number of thumbnail images to be printed is "80", "112=INT(9000/80)" is set as the number of interval frames.

And, the index processing means 35 specifies the index image of each partial motion picture data by specifying the print frame number for each number of interval frames from the start frame number to the end frame number (STEP 307). For example, when the number of the partial motion picture data is N (1 to 80), this can be calculated basically based on the formula of "start frame+INT (number of interval frames×(N−1))".

The index processing means 35 transfers the frame information (frame number representing which frame) of the specified frame to be printed to the PC card IF means 34.

The PC card IF means 34 refers to an external memory via the PC card slot 18 or the like, and acquires image compression data regarding the image (input image) to be the subject of printing (STEP 308).

The expansion control means 36 performs expansion processing to the acquired image compression data, and restores the image data (STEP 309). Incidentally, this expansion processing is omitted when non-compressed image data is acquired.

Next, the print data generation means 37 performs prescribed image processing normally conducted in printing operations to the plurality of restored image data (index image data), and also generates print data by associating the index image data and thumbnail image number such that the plurality of index images is disposed in association with each thumbnail image number in the printing medium (preferably, such that the thumbnail image number is printed at the lower position of each index image) (STEP 309). Further, when the size of the plurality of image data is large and will not fit onto one page upon being disposed as is, the constitution may be such that reduction processing is performed as necessary.

Next, the print data generated as described above is sent to the print engine 11 by the print control unit 3, and printing is executed in the power mechanism unit 2 (STEP 310). Thereby, the first index printing processing is ended.

FIG. 5 shows the printing result of the index printing. As shown in FIG. 5, with the first index printing, a frame image for each partial motion picture data is printed as an index image 4b on a printing medium 4a. Further, a corresponding thumbnail image number 4c is indicated below each index image 4b. When the user reviews this index printing result and wishes to specify an image to be examined in further detail, such user may confirm further detailed images by designating the thumbnail image number corresponding to such image (also the identification data of the partial motion picture data containing such frame image) and designating refinement index printing.

Explanation is continued upon returning to FIG. 4. The index processing means 35, upon executing the initial index printing processing, stands by for the execution designation of refinement index processing based on the execution result of the previous index printing processing.

Here, the user may input the designation of refinement index with the panel IF means 21 as shown in FIG. 6. The panel IF means 21 comprises an LCD 16a for displaying the menu and setting status, and an operation key 16b. When the user operates the operation key 16b and designates the refinement index printing command, the panel IF means 21 receives such command.

And, when the panel IF means 21 receives the refinement index printing command from the user, it commences such refinement index printing processing. Here, in the timing of commencing the processing, the designation of the target area (thumbnail image number) of the refinement index printing is received from the user (STEP 311).

The index processing means 35, upon receiving the designation of the thumbnail image number of refinement index printing, refers to the respective parameters set in the previous index printing processing according to the designated thumbnail image number, and newly sets the respective print parameters (start frame number, end frame number, total number of frames) to be used in the refinement index printing (STEP 312). Specifically, this may be calculated pursuant to "start frame number=previous start frame number+(number of previous interval frames×(designated thumbnail image number−1))", "end frame number=previous start frame+(number of previous interval frames×(designated thumbnail image number)−1)", "total number of frames=end frame number−start frame+1". Incidentally, in the designation of the thumbnail image number of refinement index printing, one or a plurality of thumbnail image numbers can be designated.

And, the index processing means 35, when the setting of the values of the respective print parameters is finished, returns to STEP 304 to continue processing for executing index printing processing targeting the refined print target data. When index printing is executed at STEP 310, the index processing means 35 ends the refinement index printing processing, and stands by for the execution designation of the subsequent index printing processing.

In the second index printing shown in FIG. 5, thumbnail image number=5 in the first printing is designated, and the frame images of number 451 onward, which were not printed in the first index printing, are printed. Moreover, in FIG. 5, in the third index printing, thumbnail image number=3 in the second printing is designated, and frame image 454 of number 453 onward, which was not printed in the second index printing, is printed.

According to FIG. 5, although the user is selecting thumbnail image number=2 in the third index printing, further detailed motion picture data according to the thumbnail image number 2 does not exist. Thus, the image 454 corresponding to the thumbnail image number 2 is printed in the normal print mode.

According to the above, since the target (range of motion picture data) of index printing can be refined in phases according to the user's designation, the user is able to efficiently arrive at one's desired still image.

Second Embodiment

Next, the second embodiment pertaining to the present invention is explained. The second embodiment is characterized in that the printing contents and the thumbnail image number are associated to enable the free execution of re-index printing based on the result of index printing.

Figure 7:
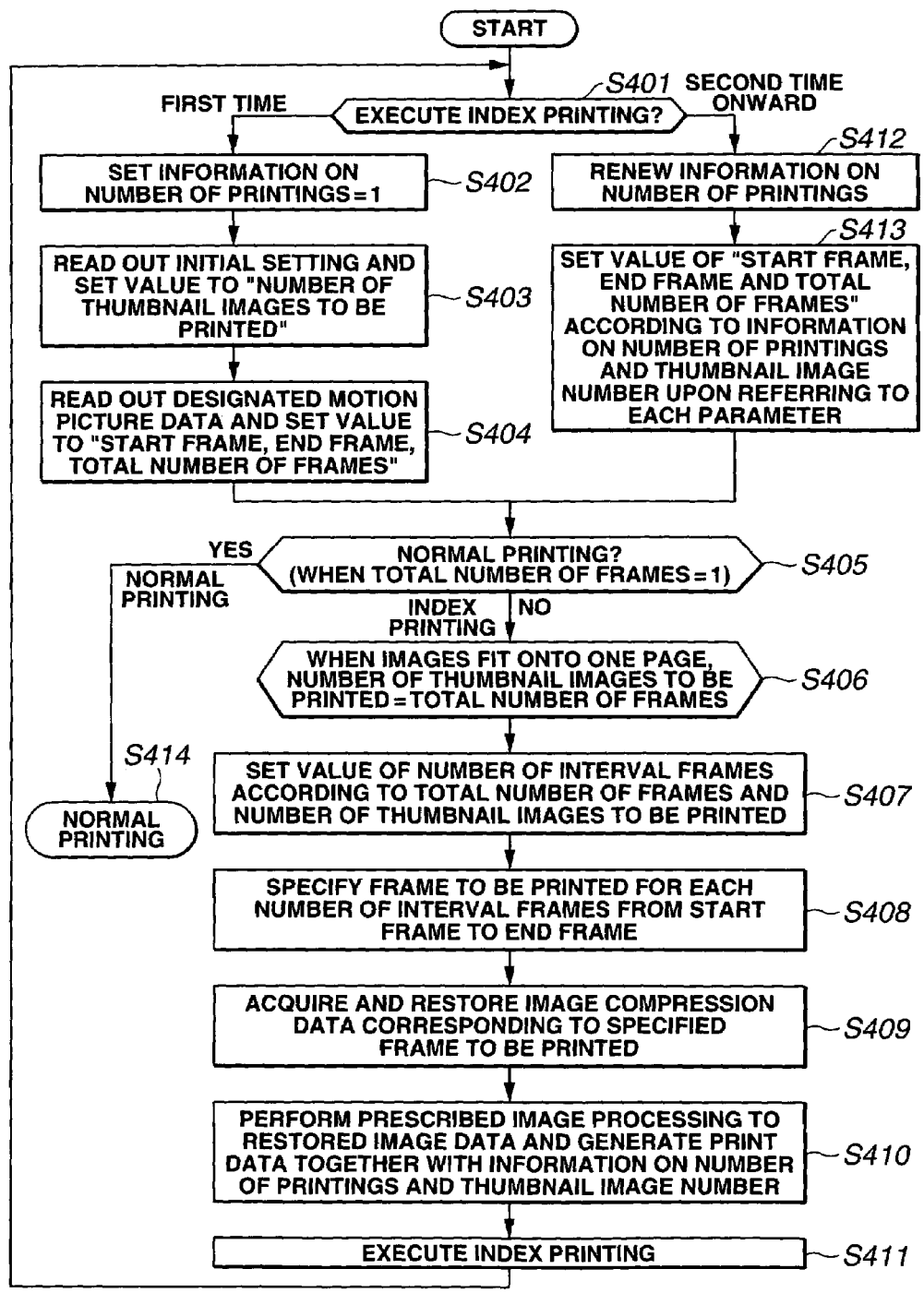
FIG. 7 is a flowchart showing another example of index printing processing.
Figure 8:
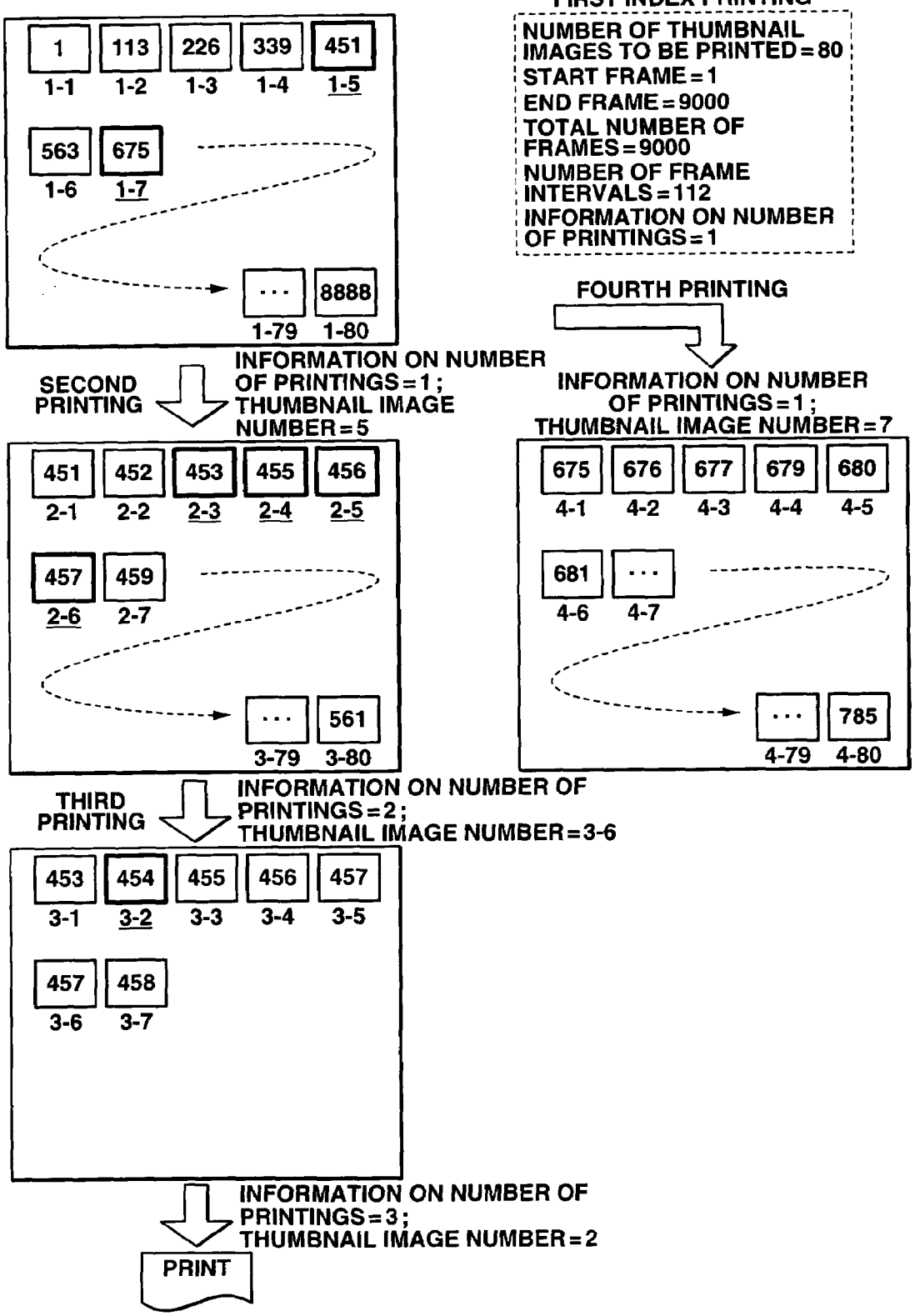
FIG. 8 is a diagram showing the printing result of index printing based on the processing illustrated in FIG. 7.
Figure 9:
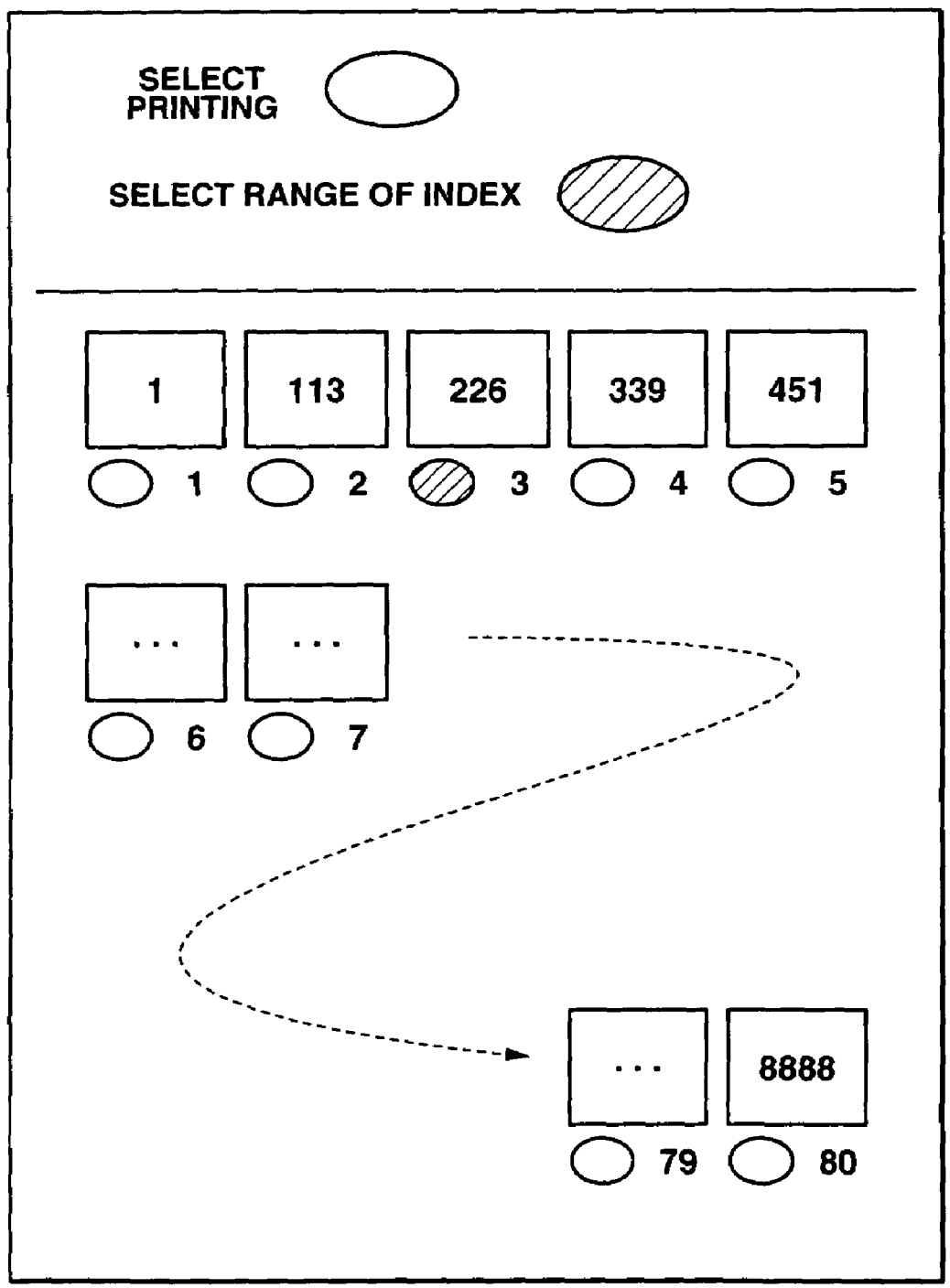
FIG. 9 is a diagram showing another printing result of index printing.

Index printing processing in the printer 1 is now explained in detail with reference to the flowcharts shown in FIG. 7 and FIG. 8. The order of the respective steps may be arbitrarily changed or may be executed in parallel within a range that will not contradict the processing contents thereof. Further, the end of processing may be realized by employing, for example, interruption or the like. FIG. 7 is a flowchart showing an example of the index printing processing with the print control unit 3 pertaining to the second embodiment. FIG. 8 is a diagram showing the print result of index printing pertaining to the second embodiment.

Incidentally, the setting information storage means 32 in this embodiment associates and stores the printing contents and print parameters. For example, information representing the number of index printing operations (information on number of printings) is set, and such information on number of printings and the printing parameter are associated and stored. Information on number of printings corresponds to the number of executions of index printings conducted for refining the index image.

The index printing processing pertaining to the second embodiment has the same basic flow as the index printing processing pertaining to the first embodiment. The panel IF means 21 starts the processing upon receiving the index printing designation command from the user. The panel IF means 21, upon receiving the index printing designation command from the user, notifies the index processing means 35 of the execution designation of index printing (STEP 401).

The index processing means 35 determines whether the index printing designation command is designating normal index printing or refinement index printing. Normal index printing is the first index printing, and refinement index printing is the second index printing onward. Incidentally, in the case of normal index printing, image data is designated by the user at a timing of receiving the index printing designation command. Motion picture data, for instance, can be designated by inputting the designation of the motion picture file, and the start frame number and end frame number of the motion picture data.

When the index processing means 35 determines that it is normal index printing (STEP 401; Yes), it sets 1 to the information on number of printings (STEP 402).

Next, the index processing means 35 reads the initial setting from the initial information storage means 31 and sets a value to the number of thumbnail images to be printed (STEP 403). And, the index processing means 35 acquires the designated motion picture data, and respectively sets the values of the start frame number, end frame number and total number of frames (STEP 404). The value of each -set parameter is associated with the information on number of printings and stored in the setting information storage means 32.

Next, the index processing means 35 determines whether to move to the normal printing mode (STEP 405), and, when it is the index printing mode, sets the total number of frames as the number of thumbnail images to be printed when the total number of frames is less than the number of thumbnail images to be printed (STEP 406).

And, the index processing means 35 calculates the number of interval frames according to the total number of frames and the number of thumbnail images to be printed, associates the calculated number of interval frames with the information on number of printings, and stores this in the setting information storage means 32.

And, the index processing means 35 specifies the index image of each partial motion picture data by specifying the print frame number for each number of interval frames from the start frame number to the end frame number (STEP 407).

The index processing means 35 transfers the frame number of the specified frame to be printed to the PC card IF means 34. The PC card IF means 34 refers to an external memory via the PC card slot 18 or the like, and acquires image compression data regarding the frame image to be the subject of printing (STEP 408). The expansion control means 36 performs expansion processing to the acquired image compression data, and restores the image data (STEP 409).

Next, the print data generation means 37 performs prescribed image processing normally conducted in printing operations to the plurality of restored image data, and also generates print data by associating the index image data and identification information which is constituted by the information on number of printings and the thumbnail image number, such that the plurality of index images is disposed in association with the identification information (STEP 410).

Next, the print data generated as described above is sent to the print engine 11 by the print control unit 3, and printing is executed in the power mechanism unit 2 (STEP 410). Thereby, the first index printing processing is ended.

FIG. 8 shows the printing result of index printing. As shown in FIG. 8, with the first index printing, corresponding identification information is indicated below each index image, and this identification information is constituted by the information on number of printings and the thumbnail image number. The user reviews this index printing result and specifies an image to be examined in further detail. For example, considered is a case where such user desires further detailed printing regarding identification information "1-5" corresponding to frame number 451 and identification information "1-7" corresponding to frame number 675.

Explanation is continued upon returning to FIG. 7. The index processing means 35, upon executing the initial index printing processing, stands by for the execution designation of refinement index processing based on the execution result of the previous index printing processing. When the panel IF means 21 receives the refinement index printing command from the user, it commences such refinement index printing processing. Here, in the timing of commencing the processing, the designation (1-5) of the identification information for performing refinement index printing is received from the user.

The index processing means 35, upon receiving the start designation from the panel IF means 21 which received the designation refinement index printing, adds 1 to the value of the information on number of printings so as to renew such information on number of printings (STEP 412). Here, 2 is stored since this is the second index printing.

Next, the index processing means 35 refers to the respective parameters corresponding to the information on number of printings (1) within the designated identification information (1-5) from the setting information storage means 32, and newly sets the respective printing parameters (start frame number, end frame number, total number of frames) to be used in the refinement index printing (STEP 413). And, the index processing means 35, when the setting of the values of the respective print parameters is finished, associates and stores this with the information on number of printings.

Referring to FIG. 8, in the second index printing, identification information="1-5" in the first printing is designated, and the frame images (451 to 562) of number 451 onward, which were not printed in the first index printing, become the target of printing.

Further, in the third index printing shown in FIG. 8, a plurality of identification information ("2-3" "2-4" "2-5" "2-6") in the second printing is designated, and the frame images (453 to 458) corresponding to such plurality of identification information are printed. As described above, the user is able to arbitrarily decide the target to be designated for refining the index image.

Meanwhile, according to FIG. 8, in the fourth index printing, the user returns once again to the first printing, and selects "1-7" among the first printing results. Thereby, frame images (675 to 785) of 675 onward, which were not printed in the first index printing, are targeted and further detailed images are printed.

According to the above, when the target (range of motion picture data) of index printing is to be refined in phases according to the user's designation, since the user will be able to continuously perform the respective refinement operations against the plurality of areas based on one motion picture data, such user is able to efficiently arrive at a plurality of still images.

Third Embodiment

Next, the third embodiment pertaining to the present invention is explained. The third embodiment is characterized in that the range of printing can be designated and printed when performing normal printing based on the index printing result (range specification printing).

Figure 10:
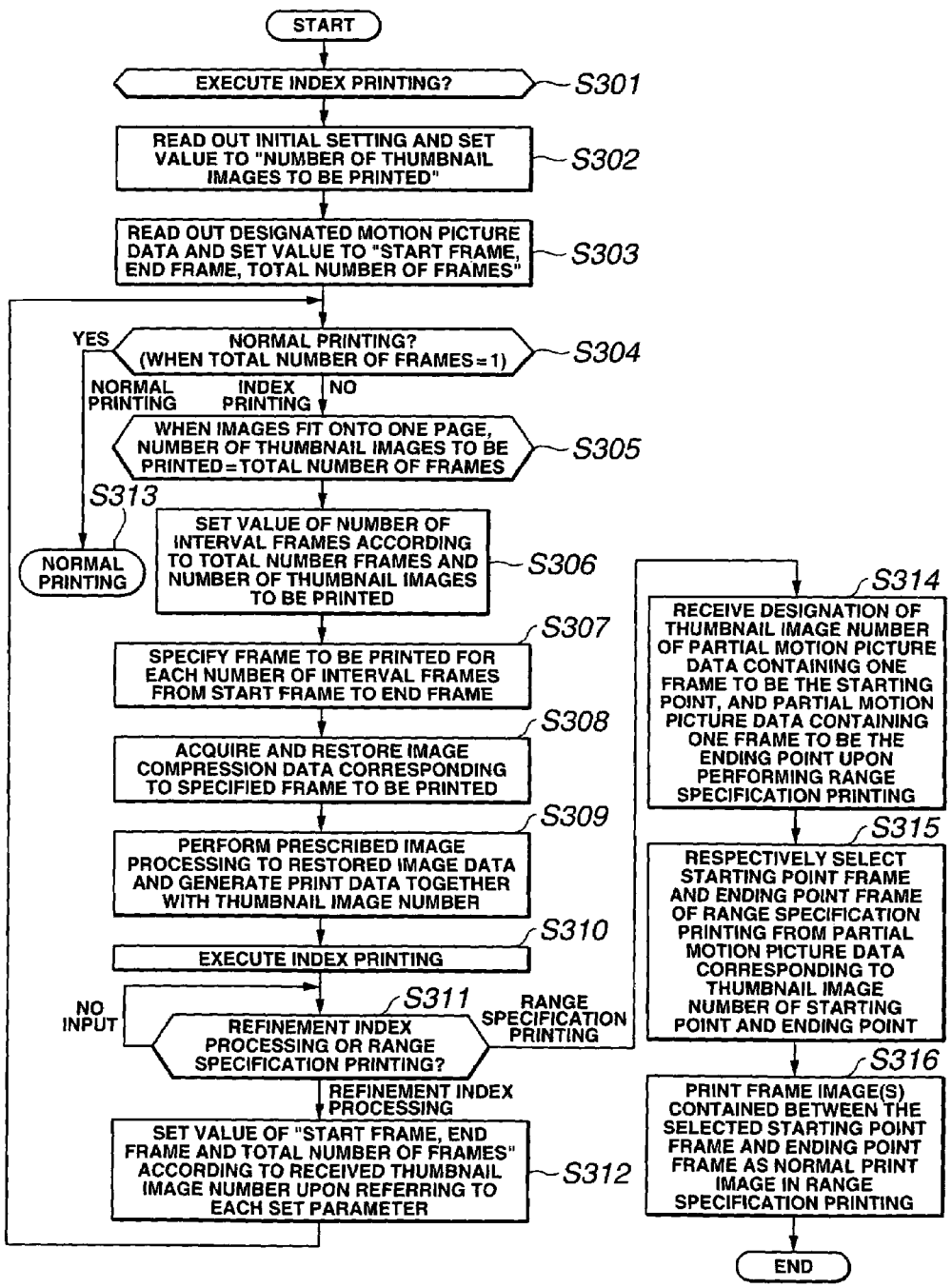
FIG. 10 is a flowchart showing an example of motion picture display processing with the printer control unit 3.

Index printing processing in the printer 1 is now explained in detail with reference to the flowchart shown in FIG. 10. The order of the respective steps may be arbitrarily changed or may be executed in parallel within a range that will not contradict the processing contents thereof. Further, the end of processing may be realized by employing, for example, interruption or the like.

Among the index printing processing pertaining to the third embodiment, the respective steps of S301 to S310 and S312 to S313 are the same as the index printing processing pertaining to the first embodiment, and the explanation thereof is omitted.

The index processing means 35, upon executing the initial index printing processing at S310, stands by for the execution designation of refinement index processing or the execution designation of range specification printing based on the execution result of the previous index printing processing. Here, the user is able to input the designation of the refinement index or range specification printing with the panel IF means 21 shown in FIG. 6.

The index processing means 35, when the panel IF means 21 receives a refinement index printing command from the user, starts the refinement index printing processing as in the first embodiment (S311).

Meanwhile, when the panel IF means 21 receives a range specification printing command from the user, the index processing means 35 starts the range specification printing processing. Here, in the timing of commencing such processing, the designation of the thumbnail image number of the partial motion picture data containing one frame to become the starting point upon performing the range specification printing and the partial motion picture data containing one frame to become the ending point is received from the user (STEP 314).

The index processing means 35, upon receiving the designation of the thumbnail image number of the starting point and ending point in the case of performing range specification processing, respectively selects the starting point frame and ending point frame of the range specification printing from the partial motion picture data corresponding to the thumbnail image number of the starting point and ending point (STEP 315). For example, as the starting point (ending point) frame, a frame used as the index image of the respective partial motion picture data may be selected. Incidentally, when the total number of frames of the corresponding partial motion picture data is 1, such one frame will be selected.

Next, the index processing means 35 prints the frame image(s) contained between the selected starting frame and ending frame as the normal printing image in the range specification printing (STEP 316).

Figure 11:
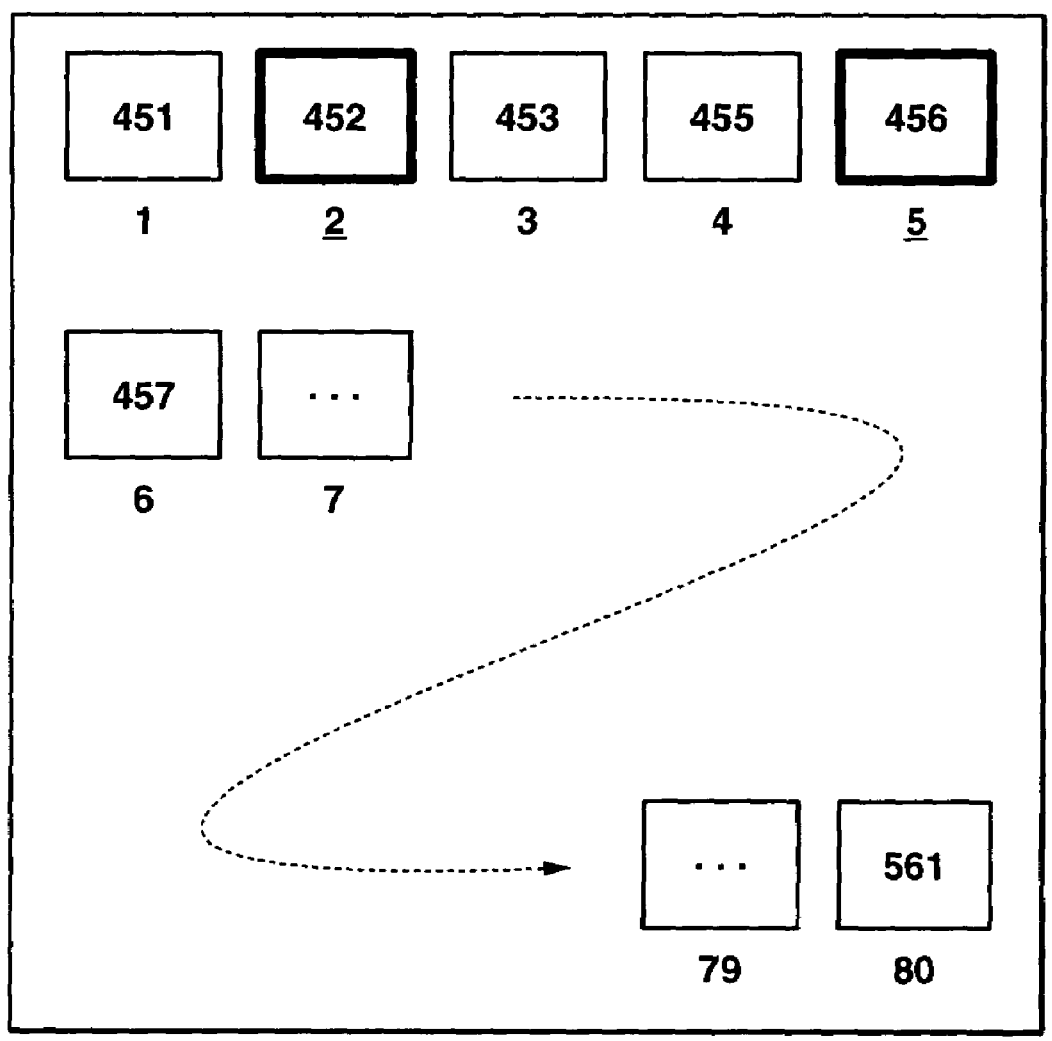
FIG. 11 is a diagram showing an example of a case of performing range specification printing based on the printing results of index printing.

For example, in a case where index printing has been conducted as in FIG. 11, when the thumbnail image numbers ("2", "5") of the partial motion picture data of the starting point and ending point are designated for the range specification printing, since the total number of frames of the respective partial motion picture data is 1, frame number 452 as the starting point frame and frame number 455 as the ending point frame will be selected. And, as a result, a total of four frame images of frame numbers 452 to 455 will be printed as normal printing images in the range specification printing.

According to the above, when it is desirable to collectively print a prescribed range of frame images, collective printing can be designated based on the printing result of the index image, and printing can be conducted efficiently.

Other Embodiments

The present invention is not limited to each of the foregoing embodiments, and may be variously modified and employed.
(1) For example, in the foregoing embodiments, although a case was explained of employing the present invention in a printer device, the present invention may also be employed in a device having a motion picture processing function (e.g., digital camera, portable phone, motion picture processing software of personal computers, and so on).
(2) Further, in the foregoing embodiments, although a case was explained of index-printing an index image, when the image processing device comprises a display device (display), this may be constituted such that the index image is displayed on the display device. In such a case, in addition to the method of designating a thumbnail image number of the index image to which the index image is disposed, the constitution may be such that the user directly selects the respective index images displayed on the display with a mouse or the like so as to specify the partial motion picture data containing the index image, start frame number, end frame number, total number of frames and so like, based on such selected index image. According to the foregoing constitution, when trying to perform image processing to motion picture data on the image processing device, or when trying to specify frame images to be printed from the motion picture data on the image processing device, index images can be refined by selecting the index images displayed on the display.
(3) Moreover, when the image processing device comprises a function of reading images (scanner function), the constitution may be such that a column (so-called answer sheet) for the user to directly designate one's desired thumbnail image number is disposed in the printing medium, and the thumbnail image number designated by the user may be specified by scanning such column.
(4) In addition, frame images to be printed are not limited to the initial frame images in the partial motion picture data. The position and quantity of frame images to be adopted as the index image may be arbitrarily set. For instance, the image with the most movement in the partial motion picture data may be selected as the frame image to be printed.
(5) Further, in the foregoing embodiments, although a case was explained of associating and printing/displaying the frame image and thumbnail image number, the information to be associated and printed/displayed is not limited to the thumbnail image number. For example, the constitution may be such that the frame number of the frame image or the range of frame image of the partial motion picture data containing the frame image may be printed/displayed, and the user may thereby designate the frame number.
(6) Moreover, in the foregoing embodiments, although a case was explained where normal printing is performed when the total number of frames of the partial motion picture data is 1, the constitution may be such that, even when the total number of frames is not 1, upon receiving the execution designation of normal printing, for example, printing may be executed in the normal printing mode targeting the frame images of the frames employed as the index image.

The entire disclosure of Japanese Patent Application No. 2004-022069 filed on Jan. 29, 2004, and No. 2004-349489 filed on Dec. 2, 2004, including specification, claims, drawings and summary are incorporated herein by reference in its entirety.

What is claimed is:

1. A printer having a function of index-printing a plurality of frame images based on motion picture data, a printer having a function of index-printing a plurality of frame images based on motion picture data, the printer comprising:
    a setting unit configured to set the number of thumbnail images in said index printing;
    a first designation unit configured to designate motion picture data;
    a first printing unit configured to select and print, upon dividing said designated motion picture data into a plurality of partial motion picture data according to said set number of the thumbnail images, a frame image for each of the divided partial motion picture data;
    a second designation unit configured to designate specific motion picture data from said plurality of partial motion picture data; and
    a second printing unit configured to select and print, upon additionally dividing said designated specific partial motion picture data into a plurality of partial motion picture data according to said set number of the thumbnail images, a frame image for each of the divided partial motion picture data.

2. A printer according to claim 1, wherein said first printing unit performs printing upon associating the frame image selected for each said partial motion image data and the number of the thumbnail image to which said frame image is disposed.

3. A printer according to claim 1, wherein said second designation unit designates said specific partial motion picture data by designating said thumbnail image number.

4. A printer according to claim 1, wherein, when said designated specific partial motion picture data is constituted by one frame, said second printing unit prints the frame image corresponding to said one frame as a normal print image, and, when said designated specific partial motion picture data is constituted by a plurality of frames, said second printing unit prints a plurality of frame images based on said specific partial motion picture data as an index image.

5. A printer according to claim 1, wherein, when partial motion picture data containing one frame to become the staffing point and partial motion picture data containing one frame to become the ending point of range specification printing are designated by said second designation unit, said second printing unit prints the frame image contained between said staffing point and ending point as a normal print image in range specification printing.

6. A printer having a function of index-printing a plurality of frame images based on motion picture data, a printer having a function of index-printing a plurality of frame images based on motion picture data, the printer comprising:

a setting unit configured to set the number of thumbnail images in said index printing;

a designation unit configured to designate motion picture data to be the subject of printing; and a printing unit configured to select and print, upon partitioning said motion picture data into a plurality of areas according to the said set number of the thumbnail images, a frame image for each area;

wherein said designation unit is constituted so as to refine and designate the range of motion picture data to be the subject of printing by designating said partitioned area.

7. A printer control method having a function of index-printing on a printer a plurality of frame images based on motion picture data, comprising:

setting the number of thumbnail images in said index printing;

designating motion picture data;

selecting and printing, upon dividing said designated motion picture data into a plurality of partial motion picture data according to said set number of the thumbnail images, a frame image for each of the divided partial motion picture data;

designating specific partial motion picture data from said plurality of partial motion picture data; and selecting and printing on the printer, upon additionally dividing said designated specific partial motion picture data into a plurality of partial motion picture data according to said set number of the thumbnail images, a frame image for each of the divided partial motion picture data.

8. An image processing device having a function of index-displaying on a display device a plurality of frame images based on motion picture data, comprising:

a setting unit configured to set the number of thumbnail images in said index printing;

a first designation unit configured to designate motion picture data;

a first display unit configured to select and display on said display device, upon dividing said designated motion picture data into a plurality of partial motion picture data according to said set number of the thumbnail images, a frame image for each of the divided partial motion picture data;

a second designation unit configured to designate specific partial motion picture data from said plurality of partial motion picture data; and a second display unit configured to select and display on said display device, upon additionally dividing said designated specific partial motion picture data into a plurality of partial motion picture data according to said set number of the thumbnail images, a frame image for each of the divided partial motion picture data.

* * * * *